US006766835B1

(12) United States Patent
Fima

(10) Patent No.: US 6,766,835 B1
(45) Date of Patent: Jul. 27, 2004

(54) TANK MONITOR SYSTEM

(76) Inventor: Raoul G. Fima, 2392 Fire Mountain Dr., Oceanside, CA (US) 92054

( * ) Notice: Subject to any disclaimer, the term of this patent is extended or adjusted under 35 U.S.C. 154(b) by 0 days.

(21) Appl. No.: 10/252,350

(22) Filed: Sep. 23, 2002

(51) Int. Cl.$^7$ .................................................. B65B 1/04
(52) U.S. Cl. ............................. 141/95; 141/94; 141/82; 222/146.2; 222/146.5; 219/482; 219/490; 219/496; 122/14.31; 122/14.21
(58) Field of Search ................................ 219/482, 490, 219/496; 141/95, 198, 192, 94, 82; 222/146.2, 146.5, 154; 122/14.31, 14.21

(56) References Cited

U.S. PATENT DOCUMENTS

| | | | |
|---|---|---|---|
| 2,967,523 A | * | 1/1961 | Wobbe ....................... 122/13.3 |
| 3,154,248 A | | 10/1964 | Fulton et al. |
| 3,961,156 A | | 6/1976 | Patton |
| 4,343,987 A | * | 8/1982 | Schimbke et al. ........... 392/312 |
| 4,371,779 A | * | 2/1983 | Maynard et al. ............ 392/449 |
| 4,381,075 A | | 4/1983 | Cargill et al. |
| 5,240,022 A | | 8/1993 | Franklin |
| 5,279,338 A | * | 1/1994 | Goossens ....................... 141/95 |
| 5,428,347 A | | 6/1995 | Barron |
| 5,632,302 A | | 5/1997 | Lenoir, Jr. |
| 6,084,520 A | | 7/2000 | Salvucci |
| 6,276,309 B1 | | 8/2001 | Zeek |
| 6,360,793 B1 | * | 3/2002 | Sugano et al. .............. 141/197 |

* cited by examiner

*Primary Examiner*—Steven O. Douglas
(74) *Attorney, Agent, or Firm*—Michael Best & Friedrich LLP

(57) ABSTRACT

A hot water tank monitoring system is designed to shut off the water supply to the hot water tank and to shut off either the electrical supply or the gas supply to the heating unit of the hot water tank in response to sensing of malfunction of one or more of a number of different sensed parameters. These parameters include a water leak detector located beneath the water tank, a water level float sensor, a temperature sensor to sense excess temperature, and a pressure sensor located in the line between the pressure relief valve and the blow-out outlet of the water tank. Signals from the various sensors are supplied to a controller, which provides signals to a LED status indicator, and also operates to provide alarm signals through a modem over telephone lines to remote locations and to operate an alarm.

28 Claims, 4 Drawing Sheets

TANK MONITOR SYSTEM

BACKGROUND

Hot water tanks are in widespread use in both residential and commercial installations. Typically, these tanks include a heating element located at the bottom of the tank, with a hot water outlet pipe and a make-up water inlet pipe connected through the top of the tank. The tanks generally include a thermostat for setting the desired temperature of the hot water withdrawn from the tank, and typically include a blow-out outlet connected through a pressure relief valve to allow hot air, steam and hot water to be removed from the tank through the relief valve when the pressure exceeds the setting of the relief valve. This is done to prevent catastrophic explosions of the hot water tank from taking place.

The pressure relief valve may be periodically operated for relatively short intervals during the normal operation of the hot water tank. This allows bubbling steam and water to pass through the relief valve for discharge. Once the pressure drops below the setting of the relief valve, it turns off and normal operation of the hot water tank resumes. After a period of time, however, mineral deposit buildup and corrosion frequently take place in the relief valve, as a result of these periodic operations. In time, such corrosion or scale build up may impair the operation of the relief valve, so that it no longer responds to the operating pressure and fails to open. When this occurs, the possibility of a catastrophic explosion of the hot water tank exists. In actuality, such explosions do occur, and they can cause substantial damage to the structure in which the hot water tank is located.

In addition to the possibility of high pressure explosions taking place in a hot water tank, other conditions, which also can lead to significant damage to the structure in which the hot water tank is placed, can occur. As hot water tanks age, frequently they develop leaks, or leaks develop in the water inlet pipe or hot water outlet pipe to the tank. If such leaks go undetected, water damage from the leak to the surrounding building structure results.

Two United States patents, Franklin U.S. Pat. No. 5,240,022 and Barron U.S. Pat. No. 5,428,347 disclose sensor systems, utilized in conjunction with hot water tanks designed to shut off the water supply in response to the detection of water leaks. In addition, these patents include multiple parallel operated sensors, operating through an electronic control system, to either turn off the main water supply or individual water supplies to different appliances, such as the hot water heater tank.

The United States patent to Fulton U.S. Pat. No. 3,154,248 discloses a temperature control relief valve operating in conjunction with a overheating/pressure relief sensor to remove or disconnect the heat source from a hot water tank when excess temperature is sensed. The temperature sensor of Cargill is designed to be either the primary control or a backup control with the pressure relief valve.

Three other United States patents, to Lenoir U.S. Pat. No. 5,632,302; Salvucci U.S. Pat. No. 6,084,520; and Zeke U.S. Pat. No. 6,276,309, all disclose safety systems for use in conjunction with a hot water tank. The systems of these patents all include sensors which operate in response to leaked water to close the water supply valve to the hot water tank. The systems disclosed in the Salvucci and Zeke patents also employ the sensing of leaked water to shut off either the gas supply or the electrical supply to the hot water tank, thereby removing the heat source as well as the supply water to the hot water tank.

The United States patent to Patton U.S. Pat. No. 3,961,156 utilizes sensing of the operation of the standard pressure relief valve of a hot water tank to also operate a micro switch to break the circuit to the heating element of the hot water tank.

While the various systems disclosed in the prior art patents discussed above function to sense potential malfunctioning of a hot water tank to either turn off the water supply, the energy supply, or both, to prevent further damage, none of the systems disclosed in these patents are directed to a safety system for monitoring potentially damaging pressure increases in the hot water tank in the event that the pressure relief valve malfunctions. This potential condition, however, is one which is capable of producing catastrophic damage to the structure in the vicinity of the hot water tank.

It is desirable to provide a tank monitoring system which overcomes the disadvantages :of the prior art, which is capable of monitoring one or more potential failure parameters of a hot water tank, and which may be installed as an after market add on, or which may be incorporated into original equipment hot water tanks, and which further includes the capability of remote monitoring of the hot water tank.

SUMMARY OF THE INVENTION

It is an object of this :.invention to provide an improved hot water tank monitoring system.

It is another object of this invention to provide an improved hot water tank monitoring system which turns off the water supply and the energy supply to a hot water tank upon the sensing of one or more parameters of operation of the hot water tank.

It is an additional object of this invention to provide an improved hot water tank monitoring system for sensing excess pressure in the hot water tank to shut off the water supply to the tank and to shut off the energy supply to the heating unit of the tank.

It is a further object of this invention to provide a tank monitoring system for a hot water tank including a pressure sensor located to sense the pressure variations of the tank without water flow through the pressure sensor to provide an output for shutting off the water supply and/or the energy supply to the heating unit of the hot water tank when excess pressure is sensed.

In accordance with a preferred embodiment of the invention, a monitoring system for a hot water tank having an input water supply, an output water line and a source of heat energy is provided. The system includes a pressure sensor connected to sense the pressure inside the tank and provide an output signal when the sensed pressure exceeds a predetermined threshold. Additional sensors also may be provided to respond to one or more additional operating parameters of the tank, including excess temperature, water level, and water leaks to provide additional output signals whenever a sensed parameter reaches a predetermined threshold. A normally open shut off valve is located in the input water supply; and a control for disconnecting the source of heat energy from the hot water tank also is provided. A controller is coupled to receive output signals from the pressure sensor, and the additional parameter sensors, if any, and operates in response to an output signal from a sensor to close the shut off valve in the water supply line, and to cause the source of heat energy to be disconnected from the hot water tank.

Figure 1:
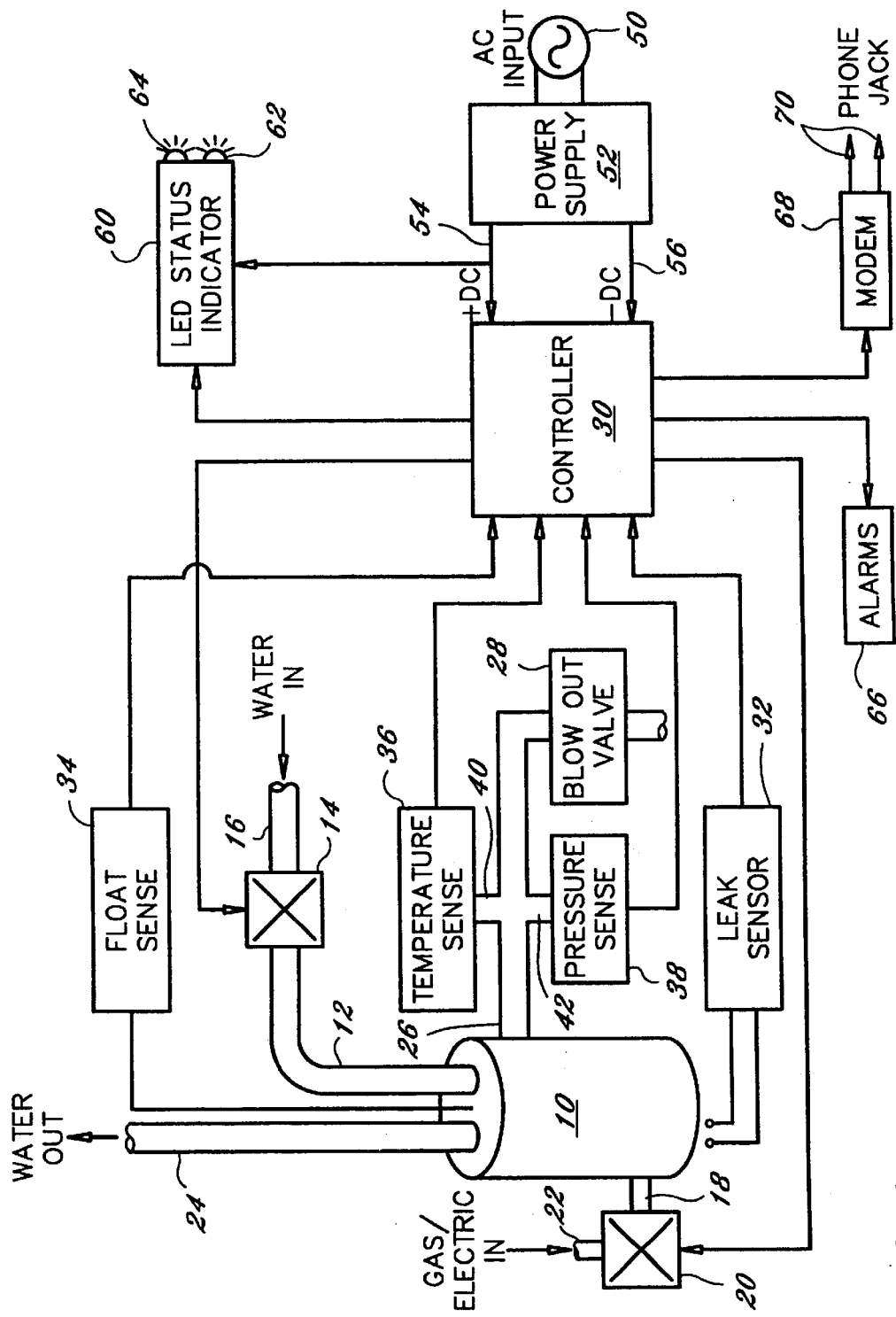
FIG. 1 is a block diagram of a preferred embodiment of the invention.

DETAILED DESCRIPTION:

Reference now should be made to the drawings, in which the same reference numbers are used throughout the different figures to designate the same or similar components. FIG. 1 is a block diagram of a hot water tank monitoring system providing comprehensive monitoring of various alarm conditions representative of malfunctioning parameters in a hot water tank. In addition, the system of FIG. 1 operates in response to a hot water tank malfunction to turn off the input water supply and to disconnect the energy source supplying heat to the hot water tank when such a malfunction occurs.

In the monitoring system shown in FIG. 1, a hot water tank 10, which may be of any conventional type, is illustrated. The hot water tank 10 may be heated either by a gas supply or an electric supply. The system operates in the same manner, irrespective of which type of heat source is employed for the hot water tank 10. Inlet or make-up water for the hot water tank 10 is supplied through an inlet supply pipe 12 through an electrically operated valve 14, from a water inlet pipe 16. The heating energy is supplied, either through a gas pipe, or through electrical lines 18, through a gas shut-off valve 20 (or alternatively, an electric power switch 20), with gas/electric power input being supplied through a gas pipe 22 (or suitable electrical leads).

Hot water produced by the tank is supplied to a water output pipe 24 in a conventional manner. The final portions of the hot water tank system include a blow-out pipe or outlet 26, which is connected to a conventional pressure relief valve 28, designed to relieve pressure in the tank 10 when the internal tank pressure exceeds a predetermined amount. Such a blow-out outlet 26 and relief valve 28 are conventional.

In the remainder of the system shown in FIG. 1, various parameter sensors are connected to a central controller 30 for providing indicia representative of the operating condition of the water tank, and for sensing different parameters of the operation of the water tank 10. If the parameters either exceed some pre-established threshold or indicate a condition which is indicative of a failure of the hot water tank 10, a signal is sent to the controller 30, which then operates to provide outputs indicative of the status of the water tank operation, and, in addition, operates to turn off the water supply to the tank and turn off the source of heat energy to the tank 10.

As indicated in FIG. 1, one of the parameter sensors is a water leak detector 32. This is indicated diagrammatically in FIG. 1, with a pair of contacts shown located beneath the water tank 10. A suitable container (not shown) to catch water leaks from the water tank 10 and the pipes 12 and 24 may be provided. When the water level becomes sufficient to bridge the contacts which are shown extending from the leak sensor 32, it provides a signal to the controller 30 indicative that a leak, either from the water tank 10 itself or from the supply pipe 12 or the water outlet pipe 24, in the vicinity of the hot water tank 10, has occurred. The signal sent to the controller 30 then is processed to place the system in its alarm and safety shut down mode. Also shown in FIG. 1 is a float sense 34 to provide an indication that the water level within the tank 10 has dropped below a safe level. Such float sensors previously have been employed in conjunction with warning systems in some-hot water tanks; and the output from the float sensor 34 is supplied to the controller 30 to cause it to operate in a manner similar to the response to the leak sensor 32.

In addition to the generally conventional leak sensor 32 and float sensor 34, the hot water tank system shown in FIG. 1 has been modified in the region of the connection to the hot water tank at 26 for the pressure relief valve 28 to employ two additional branches to sense parameters at the blow-out outlet 26. One of these is to sense temperature through a branch or leg 40 coupled with the pipe 28. A temperature sensor 36 is provided in the branch 40. A pressure sensor 38 is coupled through a branch or leg 42 to the blow-out relief valve line 26. The outputs of the temperature sensor 36 and the pressure sensor 38 also are supplied to the controller 30, as indicative of a temperature exceeding a safe operating temperature (as determined by the manufacturer of the hot water tank 10) and by sensing through the pressure sensor 38 a pressure in excess of a safe threshold (again, determined by the manufacturer of the hot water tank 10) to supply signals to the controller 30. Thus, the sensors 32,34,36 and 38 all supply independent malfunction signals, depending upon the parameter being sensed, to the controller 30 to cause it to operate whenever one of the hot water tank malfunctions occurs.

Ideally, the pressure sensor 38 is selected to provide a signal to the controller 30 at a pressure slightly below the pressure which normally would operate the relief valve 28 for the hot water tank 10. Thus, the safety system operates prior to a condition which causes the relief valve 28 to operate.

The controller 30 is supplied with operating power from a suitable power supply 52, supplied with input from an alternating current input 50. The power supply 52 is shown in FIG. 1 as supplying positive and negative DC power over lines 54 and 56, respectively. It should be noted, however, that DC power levels at other voltage levels also may be obtained from the power supply 52 for operating various electronic circuits and sub-circuits through the controller 30. Operating power also is supplied, as indicated in FIG. 1, over the positive DC power lead 54 to an LED status indicator 60. The LED status indicator 60 has at least two output status lights in the form of LED lamps 62 and 64 located in a convenient location for a home owner or maintenance person to obtain a quick visual check of the status of the hot water heater 10. Under normal conditions, with no outputs from any of the sensors 32,34,36 and 38, the controller 30 sends a signal to the LED status indicator 60 to illuminate a green LED light,62. In the event that any one or more of the sensors should supply an alarm signal to the controller 30, a signal is sent from the controller 30 to the LED status indicator .60 to turn off the green LED 62 and to illuminate a red LED 64. This indicates to a person checking on the water heater 10, either at the location of the water heater 10 or at a remote location where the LED status indicator 60 may be located, the operating condition of the water heater 10.

If an alarm condition occurs, the controller 30 also sends signals to the electric shut-off valve 14 to turn off the water supply through the inlet pipe 16, and a signal to the gas/electric shut-off valve switch 20 to turn off the supply of gas or electricity to the heating element of the water heater 10. consequently, no water is supplied to the water tank 10; and the source of heat is removed, thereby establishing as safe as possible a condition for the environment around the hot water tank 10 whenever an alarm condition exists.

At the same time, the controller 30 also may operate one or more alarms 66, which may be local or remote audible or visual alarms, and in addition, may provide, by way of a modem 68 to phone jacks 70, an automatically dialed alarm signal to a pre-established connection. In this manner, it is possible for a person at a remote location to have a call forwarded from the controller 30 indicative of the presence of shut down of the hot water tank 10 coupled with a message indicative of either an alarm condition in general, or a specific message tailored to the particular alarm condition which was sensed by the controller 30 in response to the one or more of the sensors 32,34,36 and 38 which created the alarm in the first place.

Figure 2:
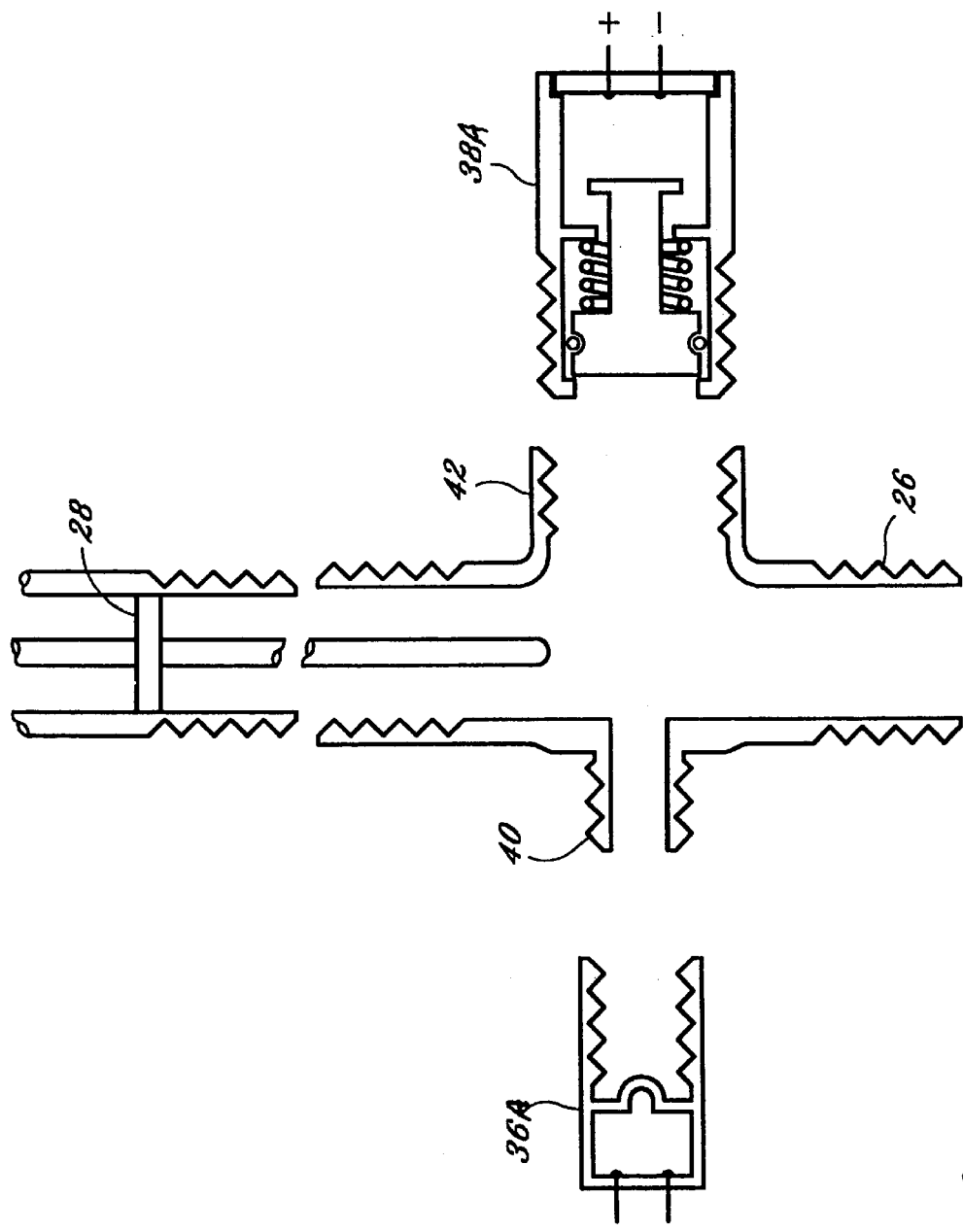
FIG. 2 is a detail of a portion of the embodiment shown in FIG. 1.

FIG. 2 is directed to a diagrammatic indication of a modification of the connections to a standard hot water heater, which are employed for providing inputs to the temperature sensor 36 and the pressure sensor 38 in a manner which are not subject to the corrosive effects of water flow in the blow-out pipe 36. As mentioned previously, the pressure relief valve 28 of most hot water tanks undergoes periodic operation during the course of the operation of the hot water tanks 10. This particularly may occur when the hot water tank 10 becomes aged. In any event, when repeated discharge of bubbling water and steam, of sufficient pressure to open the pressure relief valve 28, occurs, the hard water, scale and other corrosive effects of the water flow through the pressure relief valve 28 over a period of time may cause the relief valve 28 to become sufficiently corroded, as described previously, that it may not work; or it may require pressure in excess of the designed pressure to operate it.

In order safely and repeatedly, if necessary, to sense excess pressure without subjecting the pressure sensor to the corrosive effects of escaping water or steam, the pipe 26 supplying a connection to the relief valve 28 is fabricated with a generally "X" shaped coupler, as shown in FIG. 2. The coupler includes the portion 26 which is connected to the blow-out outlet of the hot water heater. The blow-out relief valve 28 is screwed into the opposite end in a normal manner.

On opposite sides of the pipe 26 and extending outwardly at a 900° angle to the central axis between the outlet 26 and the blow-out relief valve 28, are a pair of outlets 40 and 42. The outlet 40 has a temperature sensor element 36A threaded onto it which includes a bi-metallic operator. This bimetallic operator normally is not in contact with the electrical inlet leads of the sensor 36A. When temperature in excess of what is considered to be a safe amount by the manufacturer of the hot water tank 10 is reached, the bimetallic element in the temperature sensor 36A pops or is moved to the left, as viewed in FIG. 2, to bridge the electrical contacts and to provide an output warning signal of excess temperature to the controller 30 for operating the system as described previously. It should be noted that once the temperature sensor 36A has been operated by an excess temperature, it typically must be replaced with a new sensor, since the bimetallic element has been moved from the position shown in FIG. 2 to an operating position, described previously. Generally, such sensors are not re-settable.

On the right hand side of the fitting shown in FIG. 2 is a pressure sensor 38. The pressure sensor element 38A is threaded onto or otherwise secured to the arm 42 of the fitting shown in FIG. 2. The sensor 38A includes a pressure activated plunger which is indicated as spring loaded toward the left of the sensor 38A shown in FIG. 2. When pressure in excess of the designed parameters of the pressure sensor 38A is reached, the pressure within the pipe 26/42 forces the sealed diaphragm of the sensor element 38A toward the right to bridge the electrical contact shown to then provide an output signal to the controller 30. When the. excess pressure condition terminates, the element 38A returns to the position shown in FIG. 2, and the alarm indication is removed.

Figure 3A:
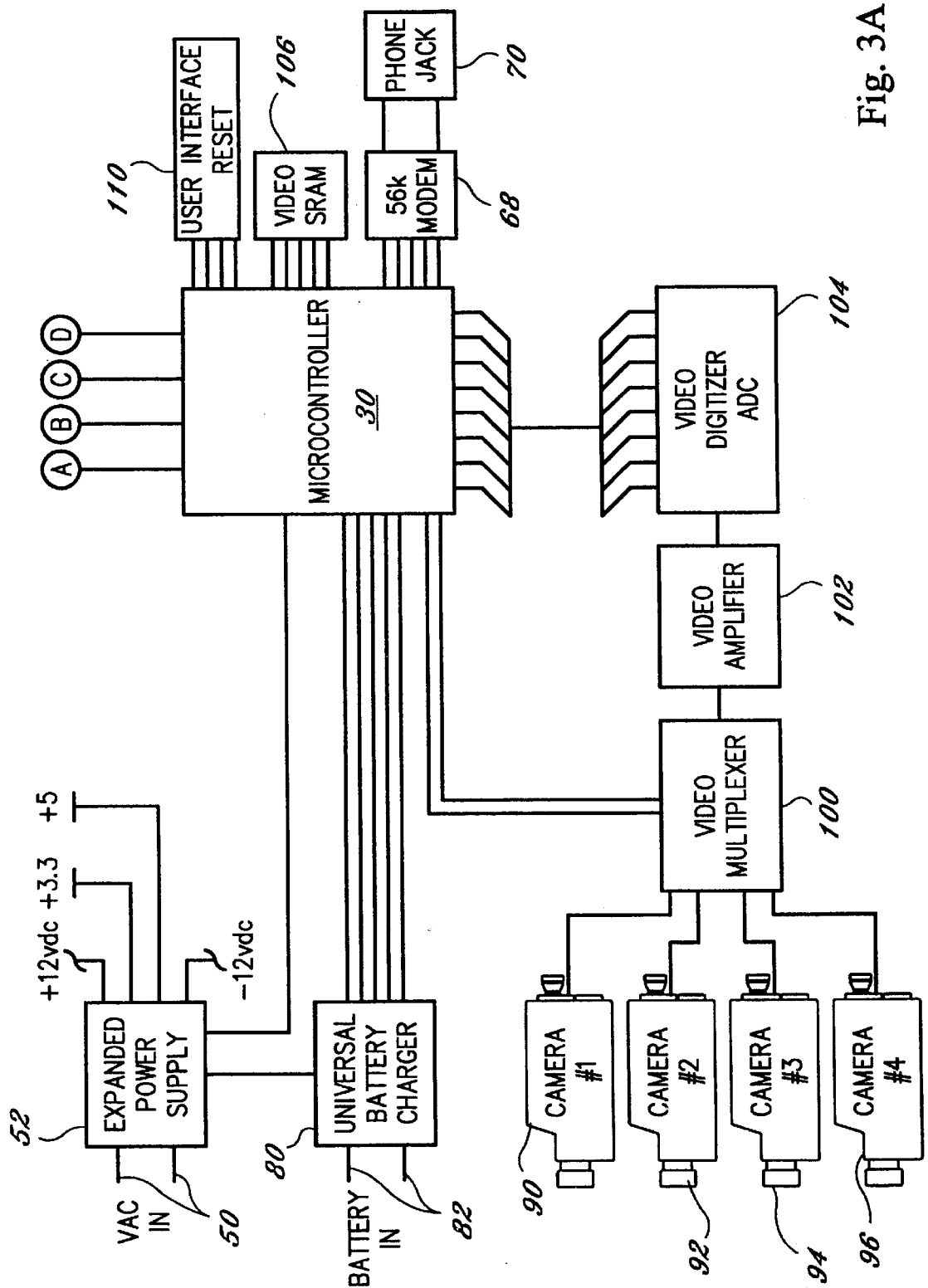
FIGS. 3A and 3B together comprise a more detailed circuit block diagram of a preferred embodiment of the invention.
Figure 3B:
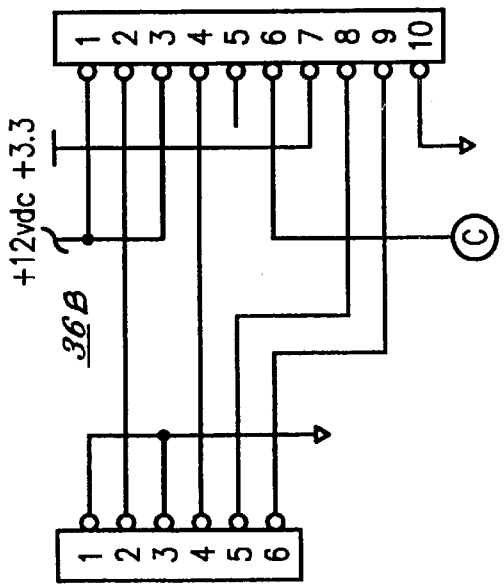
Figure 3B:
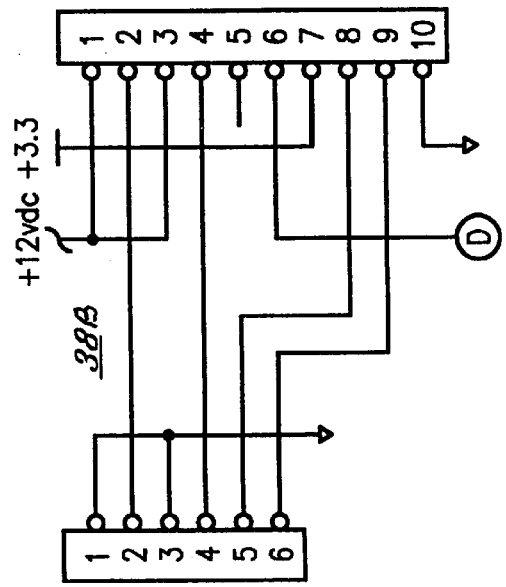
Figure 3B:
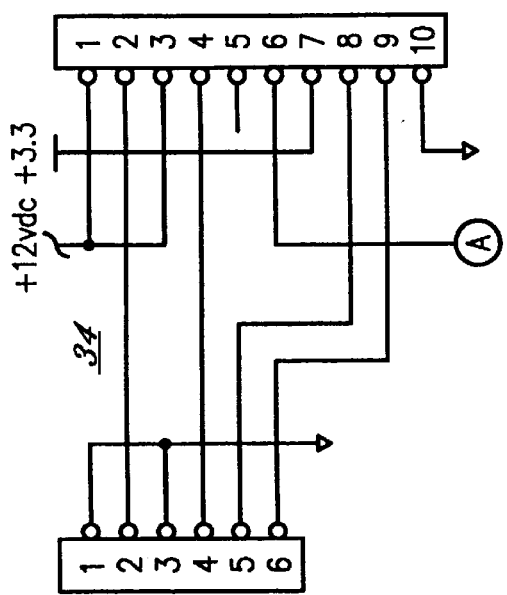
Figure 3B:
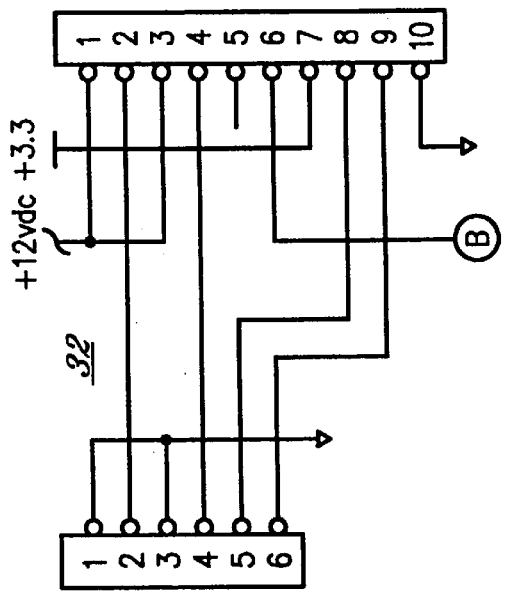

FIGS. 3A and 3B are a diagrammatic circuit diagram of the micro-controller 30 and various other connections to that micro-controller for responding to the various sensed parameters which are shown in the block diagram of FIG. 1. The micro-controller 30 is supplied with power from the power supply 52, as indicated previously. The power supply 52 includes some or all of the different voltages shown in FIG. 3A, namely+12 VDC; −12 VDC; +3.3 VDC; and. +5 VDC. These are typical operating voltages for various integrated circuits, and are employed in a preferred embodiment of the invention to operate the different sensors 32,34,36 and 38, as well as other elements of the system. Some of these voltages are supplied through the micro-controller 30; and others are obtained directly from the power supply 52. The manner in which this is done is conventional; and for that reason, all of the various circuit interconnections have not been shown in FIGS. 3A/3B.

In the event a power failure should occur, the power supply 52 also is coupled with a backup battery input shown at 82 in FIG. 3A. A universal battery charger operated in conjunction with the micro-controller 30 and the power supply 52 is employed; so that in the event there is a failure of the alternating current input at 50, the battery input at 82 continues to operate through the power supply 52 to the micro-controller 30 and other circuit components to maintain operation of the system.

The sensor circuits 32,34,36B and 38B are illustrated diagrammatically in FIG. 3B. All of these sensors include identical circuitry, operated in response to the respective sensed condition to supply an output signal to the controller 30. Consequently, it is possible to operate the system with a sensing of all of the various parameters which have been described in conjunction with FIG. 1 or less than all of them. Whichever system is employed, however, the overall operation with respect to the manner in which the signal is supplied from the sensor to the controller 30 is the same. Each of the sensors 32,34,36B and 38B includes a circuit for sensing the interconnection of contacts, such as the contacts described above in conjunction with the leak sensor 32, or with the temperature activated switch 36A, or the power sensor element 38A to supply a signal to the integrated circuit sensor block 32,34,36B or 38B. If not all of the sensors shown in FIG. 1 are employed, the appropriate one or more of them may be eliminated. The operation of the remainder of the system, however, is unchanged from that described above.

The LED status indicator 60 also may be operated in conjunction with a user interface reset 110, as shown in FIG. 3A. Typically, the reset includes a reset switch (not shown), which will provide a signal through the controller 30 to re-open the water supply valve 14 and to re-open the gas/electric valve or switch 20 for the heat source of the water tank 10. The user reset also will operate through the micro-controller 30 to reset the LED status indicator lamps to turn on the green lamp 62 and to turn off the red lamp 64. As indicated previously, however, if a temperature sensor bi-metallic switch of the type shown in FIG. 2 is employed, it also is necessary to replace the bi-metallic sensor or the alarm condition sensed by the controller 30 will continue to persist, leaving the system in its alarm state of operation.

As shown in FIG. 3A, the system also may employ video cameras 90,92,94 and 96 directed at the water heater or the area surrounding the water heater for providing a monitoring signal to the controller 30 whenever the alarm condition sensed by the micro-controller 30 is reached. Camera 90 (No.1), for example, could be directed to the area beneath the hot water tank to provide a visual indication of a water leak. Others of the cameras may be directed to different regions around the water tank, or in the room in which it is located, to provide a visual output indicative of whatever area is being scanned by that particular camera. Normally, the cameras 90,92,94 and 96 are not turned on; but whenever an alarm condition is sensed by the micro-controller 30, a signal is supplied to the cameras from the micro-controller 30, through a video multiplexer 100, to turn them on, or turn on the one associated with the particular alarm condition sensed by the micro-controller, depending upon the programming of the micro-controller 30. The video multiplexer 100 also supplies signals through a video amplifier 102 to a digitizer 104 coupled to the micro-controller 30, which then receives the signals from the camera (or cameras) out of the group of cameras 90,92,94 and 96 which has been turned on by the micro-controller 30. The signals from the cameras then are supplied to a video S-RAM 106 for storing the signals temporarily. The video signals may be sent from the micro-controller 30 through a 56K modem 68 to the phone jack 70 in the manner described previously for supplying telephone signals from the modem 68 through the phone jack 70.

The foregoing system is a comprehensive system for monitoring and controlling the safe operation of a hot water tank system. Clearly, some components of the system may be employed in other environments than the one described previously; but the system is particularly useful in monitoring and controlling a hot water tank 10 to provide a safe operating environment and to shut down the hot water tank in the event one or more alarm conditions should arise.

The foregoing description of a preferred embodiment of the invention is to be considered as illustrative and not as limiting. Various other changes and modifications will occur to those skilled in the art for performing substantially the same function, in substantially the same way, to achieve substantially the same result without departing from the true scope of the invention as defined in the appended claims.

What is claimed is:

1. A hot water tank monitoring system for a hot water tank having an input water supply line, an output water line, and a source of heat energy, the monitoring system including in combination:
    a pressure sensor connected to sense the pressure inside the hot water tank to provide an output signal when the sensed pressure exceeds a predetermined threshold;
    a normally open shut-off valve in the input water supply line;
    a control means for disconnecting the source of heat energy from the hot water tank; and
    a controller coupled to receive the output signal from the pressure sensor and in response thereto, to close the shut-off valve in the input water supply line and to cause the control means to disconnect the source of heat energy from the hot water tank.

2. The hot water tank monitoring system according to claim 1 wherein the hot water tank has a normally closed pressure relief valve connected to a corresponding blow-out outlet of the hot water tank, and wherein the pressure sensor is connected to sense the pressure between the pressure relief valve and the blow-out outlet from the hot water tank.

3. The hot water tank monitoring system according to claim 2 wherein the pressure relief valve is coupled to the blow-out outlet of the hot water tank through a relief pipe and the pressure sensor is coupled to sense the pressure in the relief pipe between the pressure relief valve and the blow-out outlet of the water tank.

4. A hot water tank monitoring system according to claim 3 further including an alarm coupled to the controller and operated thereby when the controller receives an output signal from a sensor.

5. A hot water tank monitoring system according to claim 4 further including a modem coupled to a telephone line for receiving a predetermined signal from the controller operating in response to an output signal from a sensor.

6. A hot water tank monitoring system according to claim 5 further including a status indicator including at least first and second status lights coupled with the controller, with one of the status lights indicating normal operation of the hot water tank with the water inlet valve open and the source of heat energy coupled with the hot water tank, and the other of the lights operated in response to a signal from the controller when the shut-off valve in the input water supply is closed and the source of heat energy is disconnected from the hot water tank.

7. A hot water tank monitoring system according to claim 6 wherein the lights are LED lamps and one of the LED lamps is green and the other of the LED lamps is red.

8. A hot water tank monitoring system according to claim 7 wherein the green LED lamp is turned off when the red LED lamp is turned on, and vice versa.

9. A hot water tank monitoring system according to claim 1 further including an alarm coupled to the controller and operated thereby when the controller receives an output signal from a sensor.

10. A hot water tank monitoring system according to claim 9 further including a modem coupled to a telephone line for receiving a predetermined signal from the controller operating in response to an output signal from a sensor.

11. The hot water tank monitoring system according to claim 1 wherein the pressure relief valve is coupled to the blow-out outlet of the hot water tank through a relief pipe and the pressure sensor is coupled to sense the pressure in the relief pipe between the pressure relief valve and the blow-out outlet of the water tank.

12. A hot water tank monitoring system according to claim 1 further including a status indicator including at least first and second status lights coupled with the controller, with one of the status lights indicating normal operation of the hot water tank with the water inlet valve open and the source of heat energy coupled with the hot water tank, and the other of the lights operated in response to a signal from the controller when the shut-off valve in the input water supply is closed and the source of heat energy is disconnected from the hot water tank.

13. A hot water tank monitoring system according to claim 12 wherein the lights are LED lamps and one of the LED lamps is green and the other of the LED lamps is red.

14. A hot water tank monitoring system according to claim 13 wherein the green LED lamp is turned off when the red LED lamp is turned on, and vice versa.

15. A hot water tank monitoring system for a hot water tank having an input water supply line, an output water line, and a source of heat energy, the monitoring system including in combination:
    a pressure sensor connected to sense the pressure inside the hot water tank to provide an output signal when the sensed pressure exceeds a predetermined threshold;
    an additional parameter sensor selected from the group of: water leak sensor, excess temperature sensor, and water level sensor to provide an output signal when the sensed additional parameter reaches a predetermined threshold;

a normally open shut-off valve in the input water supply line;

control means for disconnecting the source of heat energy from the hot water tank; and a controller coupled to receive the output signals from the pressure sensor and the additional parameter sensor, and, in response to any one of the output signals, to close the shut-off valve in the input water supply line and to cause the control means to disconnect the source of heat energy from the hot water tank.

16. A hot water tank monitoring system according to claim 15 wherein the additional parameter sensor is an excess temperature sensor located to sense the temperature in the relief pipe between the pressure relief valve and the blow-out outlet of the hot water tank.

17. A hot water tank monitoring system according to claim 16 further including a fitting having four interconnected arms, one of which is coupled to the blow-out outlet of the hot water tank, a second arm of which is connected to the pressure relief valve; a third arm of which is connected to the pressure sensor, and a fourth of arm of which is connected to the additional parameter sensor in the form of an excess temperature sensor wherein a water flow path exists between the blow-out outlet on the hot water tank and the pressure relief valve, wherein means isolate the pressure sensor from water between blow-out outlet of the hot water tank and the pressure relief valve, and wherein a watertight seal is located between the blow-out outlet of the water heater and the fourth arm.

18. A hot water tank monitoring system according to claim 17 further including an alarm coupled to the controller and operated thereby when the controller receives an output signal from a sensor.

19. A hot water tank monitoring system according to claim 18 further including a modem coupled to a telephone line for receiving a predetermined signal from the controller operating in response to an output signal from a sensor.

20. A hot water tank monitoring system according to claim 19 wherein the lights are LED lamps and one of the LED lamps is green and the other of the LED lamps is red.

21. A hot water tank monitoring system according to claim 20 wherein the green LED lamp is turned off when the red LED lamp is turned on, and vice versa.

22. A hot water tank monitoring system for a hot water tank according to claim 15 wherein the additional parameter sensor includes a water leak sensor, an excess temperature sensor, and a water level sensor, each providing an output signal when the sensed parameter thereof reaches a predetermined threshold, and wherein the output signals from the water leak sensor, the excess temperature sensor and the water level sensor are supplied along with the output signal from the pressure sensor to the controller, which operates in response to any one of the output signals to close the shut-off valve in the water supply line and to cause the control means to disconnect the source of heat energy from the hot water tank.

23. A hot water tank monitoring system according to claim 15 further including an alarm coupled to the controller and operated thereby when the controller receives an output signal from a sensor.

24. A hot water tank monitoring, system according to claim 15 further including a modem coupled to a telephone line for receiving a predetermined signal from the controller operating in response to an output signal from a sensor.

25. A hot water tank monitoring system according to claim 15 further including a status indicator including at least first and second status lights coupled with the controller, with one of the status lights indicating normal operation of the hot water tank with the water inlet valve open and the source of heat energy coupled with the hot water tank, and the other of the lights operated in response to a signal from the controller when the shut-off valve in the input water supply is closed and the source of heat energy is disconnected from the hot water tank.

26. A hot water tank monitoring system according to claim 15 further including a video camera directed to produce an image of a predetermined area in the vicinity of the hot water tank with the video camera connected to the controller and functioning to provide an image through a modem in response to receipt by the controller of an output signal from a sensor.

27. For use with a tank monitoring system for a hot water tank having an excess pressure relief outlet, a fitting assembly including in combination:

a first length of pipe having a fluid communication channel and first and second ends, with the first end adapted to be secured in the pressure blow-out outlet of a hot water tank and the second end adapted to be attached to an excess pressure relief valve with a direct fluid pathway between the first and second ends;

a third leg, in open communication with the fluid pathway between the first and second ends for receiving a pressure sensing device; and a fourth leg communicating with the pathway between the first and second ends and receiving a temperature sensor connected in the fourth leg for sensing temperature variations within the pathway between the blow-but outlet of the hot water tank and the pressure relief valve;

the pressure sensor including a movable diaphragm for operating a switch wherein the movable diaphragm responds to variations in pressure without the passage of any fluid through the third leg.

28. The apparatus according to claim 27 wherein the fitting assembly is a generally "X-shaped" fitting with the third and fourth legs extending substantially 90° outwardly from the pathway between the first and second ends and located on opposite sides of the pathway between the first and second ends.

* * * * *